United States Patent Office 3,613,334
Patented Oct. 19, 1971

3,613,334
APPARATUS FOR THE PURIFICATION OF WASTE GASES
Renzo Rafanelli, Via Maffia 13, Florence, Italy
Filed Apr. 9, 1969, Ser. No. 814,655
Claims priority, application Italy, Apr. 12, 1968, 833,982
Int. Cl. B01f *3/04*
U.S. Cl. 55—222   2 Claims

ABSTRACT OF THE DISCLOSURE

The waste gases of the combustion of a hydrocarbon fuel are passed along a path, in which the gases change direction, through a succession of heat exchangers until the gases exit from the last exchanger at about ambient temperature with the water vapor in the gases condensed, the gases then being passed to a filter where the condensed water and impurities are separated to leave a purified product which can now be discharged into the atmosphere. The condensed water and impurities are stored in a vessel which is periodically emptied.

BRIEF SUMMARY OF THE INVENTION

The invention relates to the purification of waste gases of the combustion of hydrocarbon fuels to prevent the formation of smog in the atmosphere, and the pollution thereof.

Generally, a substantial amount of waste gases of the above type is produced by internal combustion engines of automobiles, power plants, etc., and great effort has been expended in attempting to remove the smog-forming ingredients from the exhaust gases by improving the combustion. However, the wear of parts especially in movable systems such as motor vehicles, marine engines, etc., prevents the combustion conditions from remaining at their best level. Moreover, even in a combustion which is considered as perfect owing to the absence of CO (carbon monoxide) and other unburned substances in the exhaust gases, the exhaust emission as a whole remains highly poisonous.

An object of the present invention is to provide a device which avoids, even starting from the hypothesis of a perfect combustion, discharge of the exhaust gases into the atmosphere at high temperature. It has been found that the exhaust gases at high temperature contain water vapor (steam) which gives the gases a high lifting power, promoting their diffusion and hence fall-out, after their chemical reactions are completed.

Moreover, the combustion of the hydrocarbons, i.e., their combination with oxygen, produces a considerable quantity of water in the form of vapor, and its production in excessive quantities as well as its diffusion in the atmosphere may bring about alterations in weather conditions.

The device according to the invention completely eliminates the aforesaid deficiencies by cooling the exhaust gases to condense the water vapor and keeping in a suitable receiver the condensed water and the impurities in the gases, so that only inert and unharmful gases such as nitrogen and carbon dioxide are discharged.

According to the invention there is provided a device which effects condensing of the water vapor in the exhaust gases by cooling the same and subsequent removal of the condensed water. The water is condensed on the walls of heat exchangers by continuous changes in the direction of motion of the exhaust gases and this promotes complete contact with exhaust gases, favoring also the highest attainment of all chemical reactions. Thereby, the condensed water will contain substantially all the harmful impurities in the exhaust gases. These include hydrochloric, nitric, and sulfuric acids as well as ammoniacal products. The produced acids are diluted thus reducing their harmfulness; all these substances (water, metallic deposits, exhaust products, oxides, dyes) are deposited in a suitable receiver which is periodically drained.

DETAILED DESCRIPTION

Figure 1:
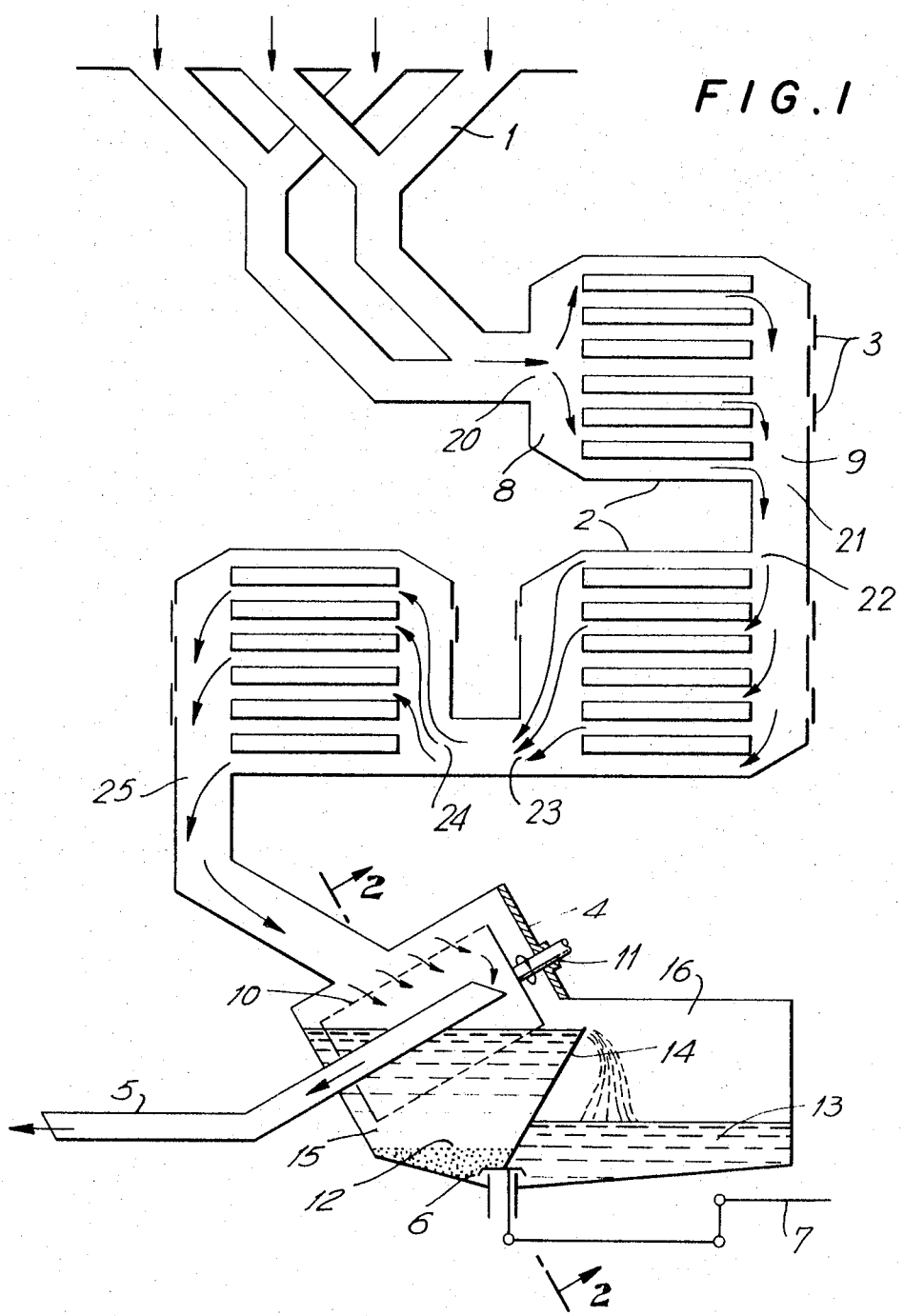
FIG. 1 is a diagrammatic illustration of a device for the purification of the waste gases of an internal combustion engine.
Figure 2:
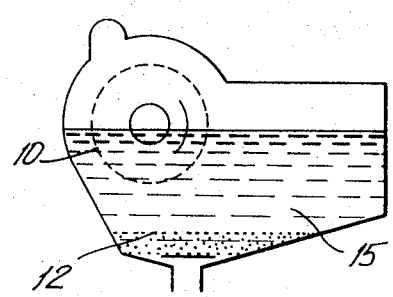
FIG. 2 is a sectional view taken along line 2—2 in FIG. 1.

The invention will hereafter be described with reference to the drawing which shows an embodiment employed with an internal combustion engine. Obviously, the invention can be used with other sources of exhaust gases which must be purified before discharge into the atmosphere.

Referring to FIG. 1 of the drawings, therein is shown the exhaust manifold 1 of a four-cylinder engine. The exhaust gases in manifold 1 are passed through successive heat exchangers 2 where the gases are cooled and finally discharged at substantially room temperature. In each exchanger 2 the gases initially enter an expansion chamber 8 where they undergo cooling and then pass through the exchanger proper and thereafter enter a second expansion chamber 9. The heat exchangers 2 are arranged in succession so as to cause the exhaust gases to successively change direction and follow an undulating path as shown by the arrows in FIG. 1. Thus, the gases enter the first heat exchanger horizontally at 20 and exit vertically at 21. The gases vertically enter the top of the second heat exchanger at 22 and travel through the exchanger proper and exit horizontally at the bottom of the second heat exchanger at 23. The gases enter the third heat exchanger horizontally at 24 and pass through the exchanger proper and exit vertically at 25.

The heat exchangers 2 are each provided with inspection doors 3 in each of the expansion chambers thereby providing access to these chambers, for cleaning purposes, where deposition of the water vapor and solid products in the exhaust gases takes place.

The heat exchangers may be constructed so that the contact surfaces thereof are cooled by the surrounding air as in conventional air-cooled radiators for a liquid engine coolant.

The cooled gases flow from the last heat exchanger to a unit 4 containing a rotating filter 10 where condensed water and impurities are separated from the exhaust gas and a purified fraction is discharged through conduit 5 into the atmosphere. The filter 10 is supported by a bearing 11.

The condensed water and impurities are deposited in unit 4 and are periodically removed by opening a valve 6 controlled by a linkage 7.

The water in the exhaust gases is initially in vapor form in manifold 1, however, the intensive cooling and expansion of the gases in the heat exchangers causes the vapor to condense and be carried from the last heat exchanger by the travel of the gas itself to the rotating filter 10. The condensed water reacts with components in the exhaust gases to produce hydrochloric, nitric, and sulfuric acids as well as ammoniacal products and these substances are removed from the exhaust gases and are transported in aqueous solution by the condensed water. The water and remaining sediment in the gas is deposited on the surface of the rotating filter 10 while the purified gas passes through filter 10 for discharge into conduit 5. The perforate surface of the filter 10 is continuously cleansed of sediment and water which drops from the filter as it rotates and ultimately by immersion and withdrawal from the water bath in the unit 4. In any event, a clean surface is always presented to the incoming gases containing the condensed water.

To promote removal of sediment, the axis of rotation of filter 10 is tilted downwardly to the left in FIG. 1 and the exhaust conduit 5 is coaxial with filter 10 and extends downwardly in the direction of discharge. The upper end of conduit 5 opens upwardly for the entry of the purified gases as shown by the arrows in FIG. 1.

The collected sediment drops to the bottom of unit 4 and is periodically removed with the collected water by opening valve 6 through the actuation of linkage 7. The linkage 7 can be connected to the gas filler pipe in such a way that removal of the gas cap will actuate linkage 7. Thereby the opening of valve 6 can be effected concurrently with a gas filling operation, thus insuring periodic drainage of unit 4. The opening of valve 6 also permits the excess water 13, which overflows wall 14, to be removed along with the sediment 12 at the bottom of the unit 4. The wall 14 divides unit 4 into a first compartment 15 containing filter 10 and conduit 5, and a second compartment 16. The upper edge of wall 14 is at a level below the inlet to conduit 5 whereby condensed water in the first compartment 15 overflows wall 14 and passes into compartment 16 before reaching the inlet of conduit 5.

What is claimed is:

1. Apparatus for the purification of waste gases containing water vapor, comprising: means for conveying the waste gases along an undulating path; means for cooling the gases as they travel along said path to condense the water vapor therein; means for receiving the thus cooled gases with the condensed water therein; means for separating the condensed water with impurities therein, from the remaining gases to provide a purified product, said separating means comprising a vessel for the condensed water and impurities, said separating means further including a cylindrical rotating filter having a perforate surface and being rotatable about an axis of rotation which is tilted with respect to the horizontal; means for discharging the purified product, said last-mentioned means comprising a conduit having an inlet in said filter and an outlet external of said filter, said conduit being coaxial with said filter and being tilted downwards with said inlet at the upper end thereof, said vessel including a separation wall dividing the vessel into first and second compartments, said rotating filter and conduit being in said first compartment, said wall having an upper edge at a level lower than the inlet of said conduit whereby condensed water in said first compartment overflows said wall and passes into said second compartment before reaching the inlet of said conduit; and valve means in said vessel for removal of the water and impurities therefrom.

2. Apparatus as claimed in claim 1 comprising linkage means coupled to the valve means for periodically operating the same.

References Cited

UNITED STATES PATENTS

| 1,186,208 | 6/1916 | Kent | 55—232 X |
| 1,616,545 | 2/1927 | Perkins | 261—91 |
| 1,800,771 | 4/1931 | Best | 55—E.T. |
| 1,831,159 | 11/1931 | Burrows | 60—31 |
| 2,081,668 | 5/1937 | Horton | 55—232 X |
| 2,796,145 | 6/1957 | King | 261—92 X |
| 3,100,376 | 8/1963 | Potter | 55—E.T. |
| 3,350,877 | 11/1967 | Bowman | 55—232 X |
| 3,522,000 | 7/1970 | Kinney | 55—222 X |

FOREIGN PATENTS

| 1,013,013 | 12/1965 | Great Britain. |

TIM R. MILES, Primary Examiner

U.S. Cl. X.R.

55—232, DIG. 30; 261—91; 60—30 L, 31 L